United States Patent [19]

Cuomo

[11] 4,363,115
[45] Dec. 7, 1982

[54] LOW FREQUENCY, LOG-PERIODIC ACOUSTIC ARRAY

[75] Inventor: Frank W. Cuomo, East Providence, R.I.

[73] Assignee: The United States of America as represented by the Secretary of the Navy, Washington, D.C.

[21] Appl. No.: 228,055

[22] Filed: Jan. 26, 1981

[51] Int. Cl.$^3$ .............................................. H04R 1/44
[52] U.S. Cl. .............................. 367/154; 343/792.5; 367/905
[58] Field of Search ............... 367/103, 104, 105, 119, 367/121, 153, 154, 155, 156, 905, 58; 343/844, 792.5

[56] References Cited

U.S. PATENT DOCUMENTS

| | | | |
|---|---|---|---|
| 3,500,414 | 3/1970 | Woerrlein | 343/113 R |
| 3,765,022 | 10/1973 | Tanner | 343/792.5 |
| 3,780,372 | 12/1973 | Unz | 343/844 |
| 3,877,033 | 4/1975 | Unz | 343/844 |
| 3,889,227 | 6/1975 | Takamizawa et al. | 367/905 X |
| 4,064,479 | 12/1977 | Ruehle | 367/154 |
| 4,075,635 | 2/1978 | Unz | 343/844 |
| 4,104,641 | 8/1978 | Unz | 343/844 |
| 4,180,792 | 12/1979 | Lederman et al. | 367/7 |

OTHER PUBLICATIONS

Hixson et al., Broadband Constant Beamwidth Acoustical Arrays, Tech. Memorandum No. 19, Acoustics Research Laboratory, May 1970.

Primary Examiner—Richard A. Farley
Attorney, Agent, or Firm—Robert F. Beers; Arthur A. McGill

[57] ABSTRACT

A method for determining optimum element spacing for a low frequency, log-periodic acoustic line array comprising a plurality of omnidirectional hydrophones arranged in a line wherein the spacing between hydrophones is based on a logarithmic relationship using multiple dipole pairs, each pair centered about the acoustic axis of the array, such that the distance between each dipole pair bears a constant ratio to the wavelength of the acoustic frequency band to be investigated by that hydrophone pair. Each dipole pair relates to a particular frequency band and the assembled array covers at least a decade range of frequencies through juxtaposition of contiguous frequency bands. The overall arrangement assures retention of selected beam pattern directionality over the entire decade range of frequencies.

1 Claim, 6 Drawing Figures

TABLE A

| | | | | | $(d/\lambda)$max = 0.5 | $(d/\lambda)$min = 0.45 | $\tau$ = 0.9 | $n$ = 22 | NULL DEPTH (dB) = 16 dB | | |
|---|---|---|---|---|---|---|---|---|---|---|---|
| 2d (ft) | f (Hz) | 2d (ft) | f (Hz) | 2d (ft) | f (Hz) | 2d(ft) | f (Hz) |
| $2d_{22} = 2.50$ | 1000 | $2d_{17} = 4.23$ | 590.5 | $2d_{11} = 7.97$ | 313.8 | $2d_5 = 14.99$ | 166.8 |
| $2d_{21} = 2.78$ | 900 | $2d_{16} = 4.70$ | 531.4 | $2d_{10} = 8.85$ | 282.4 | $2d_4 = 16.66$ | 150.1 |
| $2d_{20} = 3.09$ | 809.9 | $2d_{15} = 5.23$ | 478.3 | $2d_9 = 9.83$ | 254.2 | $2d_3 = 18.51$ | 135.1 |
| $2d_{19} = 3.43$ | 728.9 | $2d_{14} = 5.81$ | 430.5 | $2d_8 = 10.93$ | 228.8 | $2d_2 = 20.56$ | 121.6 |
| $2d_{18} = 3.81$ | 656 | $2d_{13} = 6.45$ | 387.4 | $2d_7 = 12.14$ | 205.9 | $2d_1 = 22.85$ | 109.4 |
| | | $2d_{12} = 7.17$ | 348.7 | $2d_6 = 13.49$ | 185.3 | | |

TABLE B

| | | | | | $(d/\lambda)$max = 0.5 | $(d/\lambda)$min = 0.47 | $\tau$ = 0.94 | $n$ = 38 | NULL DEPTH (dB) = 20 dB | |
|---|---|---|---|---|---|---|---|---|---|---|
| 2d (ft) | f (Hz) | 2d (ft) | f (Hz) | 2d (ft) | f (Hz) |
| $2d_{38} = 2.50$ | 1000 | $2d_{25} = 5.59$ | 447.4 | $2d_{12} = 12.49$ | 200.1 |
| $2d_{37} = 2.66$ | 940.2 | $2d_{24} = 5.94$ | 420.5 | $2d_{11} = 13.29$ | 188.1 |
| $2d_{36} = 2.83$ | 883.7 | $2d_{23} = 6.32$ | 395.3 | $2d_{10} = 14.14$ | 176.8 |
| $2d_{35} = 3.01$ | 830.8 | $2d_{22} = 6.73$ | 371.6 | $2d_9 = 15.04$ | 166.2 |
| $2d_{34} = 3.20$ | 780.8 | $2d_{21} = 7.16$ | 349.3 | $2d_8 = 16.00$ | 156.3 |
| $2d_{33} = 3.41$ | 734.0 | $2d_{20} = 7.61$ | 328.3 | $2d_7 = 17.02$ | 146.9 |
| $2d_{32} = 3.62$ | 689.8 | $2d_{19} = 8.10$ | 308.6 | $2d_6 = 18.11$ | 138.1 |
| $2d_{31} = 3.86$ | 648.5 | $2d_{18} = 8.62$ | 290.1 | $2d_5 = 19.26$ | 129.8 |
| $2d_{30} = 4.10$ | 609.6 | $2d_{17} = 9.17$ | 272.7 | $2d_4 = 20.49$ | 122.0 |
| $2d_{29} = 4.36$ | 573.0 | $2d_{16} = 9.75$ | 256.3 | $2d_3 = 21.80$ | 114.7 |
| $2d_{28} = 4.64$ | 538.7 | $2d_{15} = 10.38$ | 241.0 | $2d_2 = 23.19$ | 107.8 |
| $2d_{27} = 4.94$ | 506.3 | $2d_{14} = 11.04$ | 226.5 | $2d_1 = 24.67$ | 101.3 |
| $2d_{26} = 5.25$ | 475.9 | $2d_{13} = 11.74$ | 212.9 | | |

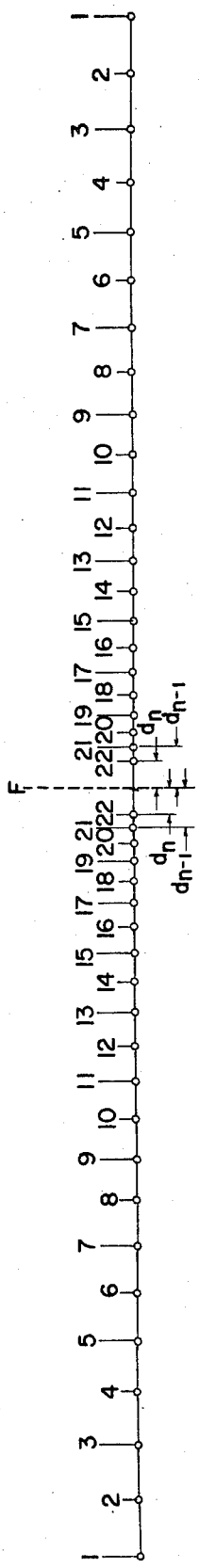

FIG. 1

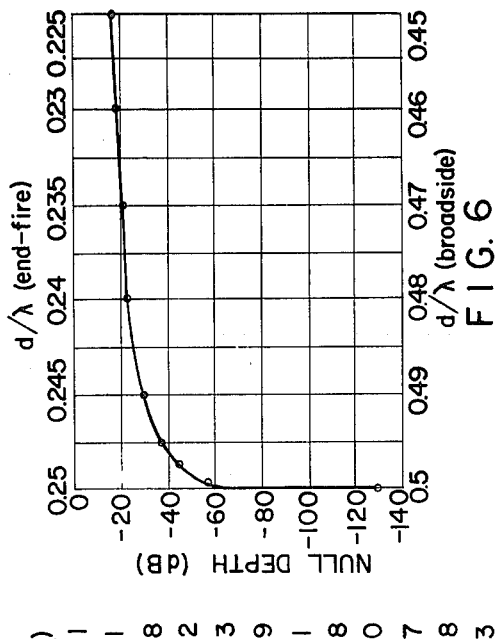

FIG. 6

TABLE A

| | $(d/\lambda)_{max}$ 0.5 | | $(d/\lambda)_{min}$ 0.45 | | $\tau$ 0.9 | NULL DEPTH (dB) = 16dB |
|---|---|---|---|---|---|---|
| 2d (ft) | | 2d (ft) | | $\dfrac{n}{22}$ | | f (Hz) |
| $2d_{22} = 2.50$ | f (Hz) 1000 | $2d_{17} = 4.23$ | f (Hz) 590.5 | $2d_{11} = 7.97$ | 2d(ft) $2d_5 = 14.99$ | 166.8 313.8 |
| $2d_{21} = 2.78$ | 900 | $2d_{16} = 4.70$ | 531.4 | $2d_{10} = 8.85$ | $2d_4 = 16.66$ | 150.1 282.4 |
| $2d_{20} = 3.09$ | 809.9 | $2d_{15} = 5.23$ | 478.3 | $2d_9 = 9.83$ | $2d_3 = 18.51$ | 135.1 254.2 |
| $2d_{19} = 3.43$ | 728.9 | $2d_{14} = 5.81$ | 430.5 | $2d_8 = 10.93$ | $2d_2 = 20.56$ | 121.6 228.8 |
| $2d_{18} = 3.81$ | 656 | $2d_{13} = 6.45$ | 387.4 | $2d_7 = 12.14$ | $2d_1 = 22.85$ | 109.4 205.9 |
| | | $2d_{12} = 7.17$ | 348.7 | $2d_6 = 13.49$ | | 185.3 |

TABLE B

| | $(d/\lambda)_{max}$ 0.5 | | $(d/\lambda)_{min}$ 0.47 | | $\tau$ 0.94 | NULL DEPTH (dB) = 20dB |
|---|---|---|---|---|---|---|
| 2d (ft) | f (Hz) | 2d (ft) | f (Hz) $\dfrac{n}{38}$ | 2d (ft) | | f (Hz) |
| $2d_{38} = 2.50$ | 1000 | $2d_{25} = 5.59$ | 447.4 | $2d_{12} = 12.49$ | | 200.1 |
| $2d_{37} = 2.66$ | 940.2 | $2d_{24} = 5.94$ | 420.5 | $2d_{11} = 13.29$ | | 188.1 |
| $2d_{36} = 2.83$ | 883.7 | $2d_{23} = 6.32$ | 395.3 | $2d_{10} = 14.14$ | | 176.8 |
| $2d_{35} = 3.01$ | 830.8 | $2d_{22} = 6.73$ | 371.6 | $2d_9 = 15.04$ | | 166.2 |
| $2d_{34} = 3.20$ | 780.8 | $2d_{21} = 7.16$ | 349.3 | $2d_8 = 16.00$ | | 156.3 |
| $2d_{33} = 3.41$ | 734.0 | $2d_{20} = 7.61$ | 328.3 | $2d_7 = 17.02$ | | 146.9 |
| $2d_{32} = 3.62$ | 689.8 | $2d_{19} = 8.10$ | 308.6 | $2d_6 = 18.11$ | | 138.1 |
| $2d_{31} = 3.86$ | 648.5 | $2d_{18} = 8.62$ | 290.1 | $2d_5 = 19.26$ | | 129.8 |
| $2d_{30} = 4.10$ | 609.6 | $2d_{17} = 9.17$ | 272.7 | $2d_4 = 20.49$ | | 122.0 |
| $2d_{29} = 4.36$ | 573.0 | $2d_{16} = 9.75$ | 256.3 | $2d_3 = 21.80$ | | 114.7 |
| $2d_{28} = 4.64$ | 538.7 | $2d_{15} = 10.38$ | 241.0 | $2d_2 = 23.19$ | | 107.8 |
| $2d_{27} = 4.94$ | 506.3 | $2d_{14} = 11.04$ | 226.5 | $2d_1 = 24.67$ | | 101.3 |
| $2d_{26} = 5.25$ | 475.9 | $2d_{13} = 11.74$ | 212.9 | | | |

LOW FREQUENCY, LOG-PERIODIC ACOUSTIC ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to acoustic line arrays and more particularly to a method of determining optimum hydrophone element spacing for a low frequency, log-periodic acoustic line array which transmits and receives over a broad range of low frequencies while retaining a beam pattern having approximately the same directional characteristics over a decade range of frequencies.

(2) Description of the Prior Art

Antennas with variable-type apertures constituted a major breakthrough in the field of wideband electromagnetic radiators primarily due to the invention of frequency independent and log-periodic structures used in both the transmit and receive modes with the object being to retain over some frequency band the same directional characteristics of the beam. Frequency independent antenna concepts have been previously applied to underwater sound systems operating in the ultrasonic frequency range. To date, however, no comparable method exists which adequately addresses element spacing for the lower end of the audio frequency range.

In one instance, Hixson and Au (E. L. Hixson and K. T. Au, University of Texas, Acoustics Research Laboratory, Technical Memorandum No. 19 of May 1, 1970) proposed a wideband constant beamwidth acoustic array utilizing quasi-logarithmic element spacing covering the 300 to 3000 Hz range. The method they used was to superimpose, on an array of given length and spacing, successive arrays of half the size and spacing while removing redundant elements to approximate a logarithmic element arrangement. A method predicting exact element location does not exist at the present time.

For a constant aperture the beamwidth and associated directivity index of an acoustic transducer varies with frequency and this is also true for transducer arrays. This effect limits the performance of wideband acoustic systems because a change or loss of directivity over the intended operational frequency will adversely affect detection capabilities. Uniformly spaced linear arrays are subject to these limitations (i.e., they are basically narrow band devices). Recent advances in transducer array design have utilized several shading techniques to reduce side lobe levels for optimum main beam characteristics. However, the problem of optimizing the broadband qualities of a low frequency omnidirectional transducer has not been fully addressed to date.

The present invention describes a method which shows how the log-periodic approach can be extended to the low end of the audio frequency regime (20 to 3000 Hz) in the design of acoustic line arrays to yield quasi-constant directionality over frequencies in excess of one decade for Broadside as well as End-Fire Arrays. Exact element location is predicted by criteria derived from the design of log-periodic dipole antennas. It should be noted that although this specification discloses the retention of acceptable dipole and cardioid patterns in selected bandwidths, the method can be applied to any array size and frequency range as long as the physical spacing of the elements remains feasible.

SUMMARY OF THE INVENTION

Accordingly, it is a general purpose and object of the present invention to provide a low frequency, linear hydrophone array. It is a further object that the hydrophones exhibit omnidirectional characteristics. Another object is that the array function in the audio frequency range (20 to 3000 Hz). A still further object is that the hydrophones be arranged in dipole pairs. Still another object is that the spacing between hydrophone dipole pairs be log-periodic. Still another object is that the acoustic beam formed by each dipole pair maintain approximately the same directional characteristics over its specified frequency band. Still another object is that the method be applicable to the End-Fire as well as Broadside Arrays. These and other objects of the present invention will become apparent from the specification and drawings.

These objects are accomplished with the present invention by providing a method of spacing multiple dipole pairs of omnidirectional hydrophones centered about the acoustic axis of an array and spaced such that each pair operates within a preselected frequency band. The null depth of the beam pattern is allowed to degenerate within acceptable limits over that particular band. The selected frequency bands are contiguous and in to define a low frequency range with a total bandwidth at least one decade long.

BRIEF DESCRIPTION OF THE DRAWINGS

FIG. 1 shows a log-periodic acoustic line array spaced in accordance with the present invention;

FIG. 6 shows a graphical plot of null depth vs. d(dipole spacing)/λ(wavelength) for both Broadside and End-Fire Array configurations.

DESCRIPTION OF THE PREFERRED EMBODIMENT

Figure 2:
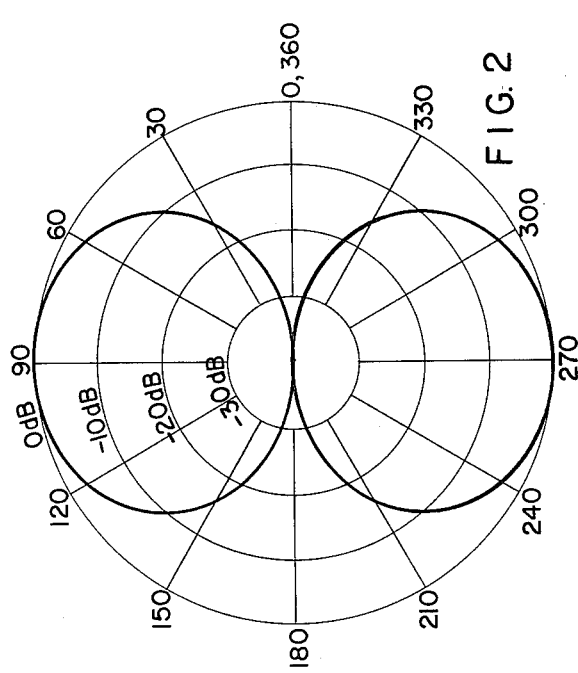
FIG. 2 shows a Broadside Array figure eight beam pattern with a full depth null.
Figure 3:
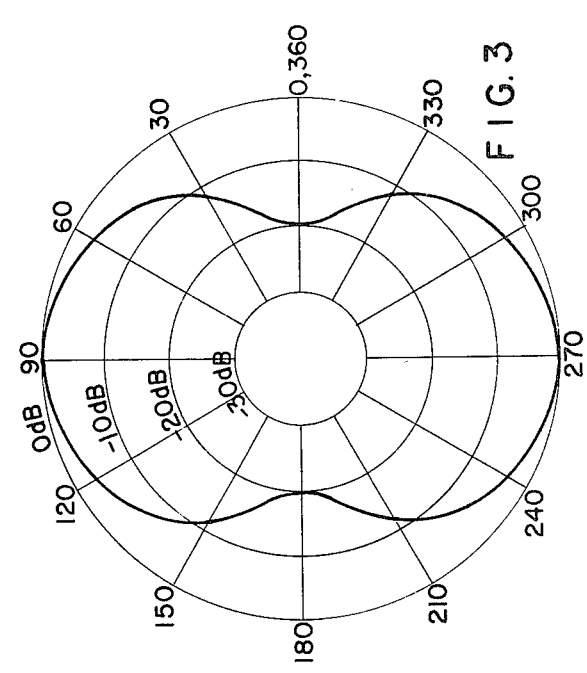
FIG. 3 shows the same beam pattern as FIG. 2 except that the null depth has degenerated to −20 dB.
Figure 4:
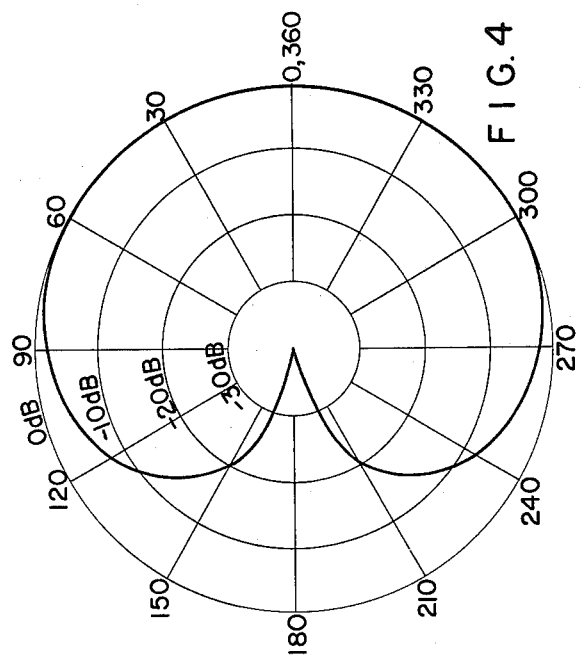
FIG. 4 shows an End-Fire Array cardioid beam pattern with a full depth null.
Figure 5:
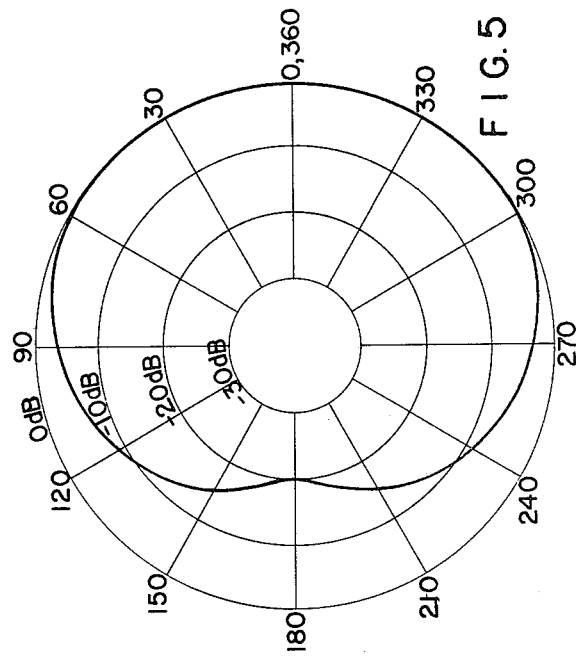
FIG. 5 shows the same beam pattern as FIG. 4 except that the null depth has degenerated to −20 dB.

Referring now to FIG. 1 there is shown a low frequency, log-periodic line array with hydrophones spaced in accordance with the method of the present invention. The array comprises a plurality of omnidirectional hydrophones arranged sequentially as a line of multiple, equal strength dipole pairs, each pair centered about the acoustic axis F of the array and spaced a distance $2d_n$, $2d_{n-1}$, etc. apart such that acceptable figure eight (Broadside) or cardioid (End-Fire) beam patterns are formed independently by each successive dipole pair over preselected contiguous acoustic frequency bands. This invention described a method which exactly determines the desired spacing between dipole pairs such that continguous frequency bands, associated with adjacent dipole pairs, will cover at least a decade of frequencies over which the directional characteristics of each pair's beam pattern remains within the specified limits. FIGS. 2 and 3 illustrate the allowed variations in null depth for each dipole pair within its specified frequency band for a Broadside Array while FIGS. 4 and 5 show similar results for an End-Fire Array. With this arrangement the innermost dipole pair spacing is based on the upper frequency limit and will operate within the highest frequency band while succeeding dipole pairs will operate within adjacent bands with succeedingly lower frequency ranges.

Prior to describing the method to be followed, it should be noted that the directional properties of a transducer are generally associated with its effective aperture in such a way that when $(a/\lambda) < 1$ (a being the largest dimension of the device and $\lambda$ being wavelength) it characteristics are basically omnidirectional while when $(a/\lambda) > 1$ they become directional. These features also hold true for acoustic arrays where the effective aperture becomes the array length. It is possible however in the latter case to generate a null in the directivity pattern along the line connecting its elements by making the array aperture equal to $(\lambda/2)$ (Broadside) of $(\lambda/4)$ with an additional 90 degree phase delay (End-Fire). In the limiting case of an acoustic dipole these conditions yield a "figure eight" or cardioid pattern, respectively.

Since acoustic detection is strongly dependent upon directionality (narrow beamwidth) and since at low frequencies such a condition is difficult to attain, this invention uses the $(\lambda/2)$ or $(\lambda/4)$ element spacing arrangements indicated above to provide one null upon which to determine bearing information.

The factor determining the directional characteristics of a dipole is the ratio $(d/\lambda)$ where d is dipole spacing and $\lambda$ is the associated acoustic wavelength. The null degeneration in the dipole pattern for values of $(d/\lambda)$ slightly less than 0.5 or 0.25 is shown in FIG. 6 for the Broadside and the End-Fire configurations, respectively. FIG. 6 was developed using well known acoustic relationships as follows:

(a) For a Broadside Array, null depth may be expressed as $$\frac{P}{P_o}(dB) = \frac{\sin \frac{n}{2}\left(\frac{2\pi d}{\lambda} \cos \phi\right)}{\sin \frac{1}{2}\left(\frac{2\pi d}{\lambda} \cos \phi\right)}$$

(where $n = 2$ for a dipole and $\phi$ represents a polar coordinate angle starting perpendicular to the axis of the dipole pair and circumscribing a Broadside beam pattern such as the one shown in FIG. 2). By choosing values of $(d/\lambda)$ of from 0.5 to 0.45 the null depth, $(P/P_o)$, in dB can be calculated for $\phi = 90$ degrees.

(b) In a similar fashion the End-Fire Array null depths were determined using the expression, $$\frac{P}{P_o}(dB) = \frac{\sin \frac{n}{2}\left[\frac{2\pi d}{\lambda}(\cos \phi - 1)\right]}{\sin \frac{1}{2}\left[\frac{2\pi d}{\lambda}(\cos \phi - 1)\right]}$$

and assigning values from 0.25 to 0.225 to $(d/\lambda)$. As can be seen from FIG. 6 the greatest changes in null depth occur for small $(d/\lambda)$ deviations from the ideal null conditions occurring at 0.5 or 0.25. At low frequencies this change is equivalent to a correspondingly small frequency range such as 100 to 99.6 Hz. It is, however, noted that acceptable Broadside null depths on the order of 16 dB or greater can be retained for $0.5 \geq d \leq 0.45$. Similar results are given for the End-Fire case on the same figure. Thus, if these conditions can be repeated periodically over some given frequency range (essentially dipole patterns with a null at least 16 dB deep) then it becomes feasible to construct a broadband acoustic array with relatively constant directionality at low operating frequencies. Such results can be realized by the application of principles underlying the design of log-periodic dipole antennas. These concepts are summarized by the statement that if a structure becomes equal to itself by a particular scaling of its dimensions, by some ratio, $\tau$, it will have the same properties at the frequencies f and $\tau$f. This results in the characteristics of the antenna being periodic functions with the period log $\tau$, of the logarithm of the frequency which can be represented by the equation, $$\log\left(\frac{d}{\lambda}\right)_{max} = \log\left(\frac{d}{\lambda}\right)_{min} - \log \tau \tag{1}$$

where $(d/\lambda)_{max}$ represents the value giving the ideal null (i.e., 0.5 for Broadside and 0.25 for End-Fire), $(d/\lambda)_{min}$ represents the value giving the desired minimum null chosen from FIG. 6 and $\tau$ is an arbitrary constant identified with the log period. Also, for a log-periodic dipole antenna it can be shown that, $$\tau = \frac{d_n}{d_{n-1}} \tag{2}$$

where n is the number of dipoles in the array and $d_n$ is the distance of the $n^{th}$ dipole element from the acoustic axis F. A low frequency, log-periodic acoustic array can thus be designed using FIG. 6 and Equations (1) and (2).

Consider a linear array of isotropic acoustic elements identified by the separations $d_n$, $d_{n-1}$, etc. referenced to the acoustic axis F. If the array is envisioned as consisting of a finite set of dipoles n, n−1, etc., each pair of elements operating independently in a Broadside configuration will generate a "figure eight" pattern with an ideal null at some frequency associated with the half wave $(\lambda/2)$ spacing as shown in FIG. 2 while at slightly lower frequencies the null in the dipole pattern begins to degenerate as shown in FIG. 3. Identical results are obtained if the dipoles are utilized in the End-Fire configuration as illustrated in FIGS. 4 and 5. Although the null depth losses illustrated by the chosen $(d/\lambda)$ ranges are quite large, a 20 dB discrimination is still retained in the same direction while the remaining directional properties of the dipole remain basically unchanged. Since a log-periodic array is not frequency independent in a strict sense it can only at best be designed so that its radiation pattern does not change appreciably over some repetition period. In this case the approach used is to define a minimum acceptable null and derive the log spacing between dipoles which will retain that null for each dipole in the array for a specified repetition period. By arranging a series of dipoles in a log-periodic array fashion (similar to log-periodic dipole antennas) it is feasible to repeat periodically these same properties at least over a frequency decade: i.e., a broadband, low frequency acoustic receiver.

The overall length of the array, i.e., the outermost dipole spacing, will determine the lowest operational frequency while the highest frequency is limited by the physical size of the hydrophones and the required separation of the innermost dipole. Equations (1) and (2) are used to determine the dipole spacings according to the minimum acceptable null depth chosen. Obviously, the greater the null depth requirements, the larger the number of elements necessary for the same overall frequency range.

To illustrate this approach two specific cases are shown in this context. The design parameters are set as follows:

(a)
Minimum null depth = 16 dB
Operational frequency range = $100 \leq f \leq 1000$ (Hz).

(b)
Minimum null depth = 20 dB
Operational frequency range = $100 \leq f \leq 1000$ (Hz).

Innermost dipole spacing d (which equal $2d_n$) was determined based upon the chosen maximum frequency (f) of 1000 Hz. Using 5000 feet/second as the average speed of sound in seawater (c) it can be shown that:

$$\lambda = \frac{c}{f} = \frac{5000}{1000} = 5 \text{ feet}$$

from which, for a Broadside dipole:

$$d = \frac{\lambda}{2} = 2.5 \text{ feet (at 1000 Hz)}$$

Using FIG. 6 for a Broadside Array and choosing an acceptable minimum null depth of 16 dB, it can be seen that $(d/\lambda)_{min}$ equals 0.45. Next, solve for $\tau$ using Equation (1) and the following parameter values:

$$\left(\frac{d}{\lambda}\right)_{max} = 0.5$$

$$\left(\frac{d}{\lambda}\right)_{min} = 0.45$$

which yields $\tau = 0.9$. Then using Equation (2) and knowing from above that $d_n = d/2 = 1.25$, and $\tau = 0.9$, solve for $d_{n-1}$, which yields $d_{n-1} = 1.39$ and $2d_{n-1} = 2.78$. Substitute $d_{n-1}$ (1.39) for the numerator $d_n$ in Equation (2) and solve for new denominator $d_{n-2}$. Continue substituting iteratively in this manner to arrive at Table A. Table B is generated in the same fashion except that the $(d/\lambda)_{min}$ chosen was 0.47 which yielded a $\tau$ of 0.94 which produced the values listed in Table B. By reducing the $(d/\lambda)_{min}$ chosen, the total number of dipole pairs increased by 16 while the directionality discrimination was improved by 4 dB.

What has been described is an array consisting of small omnidirectional acoustic sources spaced on a log-periodic basis to provide a broadband receiver whose directional response is superior to existing devices utilized for the same purpose. The broadband characteristics can be assured by associating with each dipole pair a filter network whose bandwidth is designed to fit that pair's d/λ range assuring a continuous active array. The state of the art in filter design insures that the operational features described can be met. Alternatively, use of filter networks can be surplanted by use of suitable scanning techniques whereby each dipole pair would be sequentially illuminated over some specified time if operating conditions permit.

With reference to the foregoing description, it is to be understood that what has been disclosed herein represents only a few embodiments of the invention and is to be construed as illustrative rather than restrictive in nature and that the invention is best described by the following claims.

I claim:

1. A method of determining the sequential dipole spacing of a plurality of hydrophone dipole pairs about an array acoustic axis so as to form a low frequency, log-periodic acoustic line array wherein the acoustic beam pattern formed by each independent dipole pair has a quasi-constant directionality over a frequency band and the assembled array covers at least a decade range of frequencies through juxtaposition of contiguous frequency bands, said method comprising the steps of:

selecting an operational frequency range;

determining the spacing ($2d_n$) of the innermost dipole pair using the following relationship $$2 d_n = (c/f) \quad (A)$$

wherein $d_n$ is the distance of each dipole element from the array acoustic axis, c is the speed of sound in seawater at the operational frequency, temperature and pressure the array will experience and f is the maximum desired operational frequency;

selecting a minimum null depth commensurate with desired directionality descrimination;

selecting a $(d/\lambda)_{max}$ for the ideal null from a graph wherein d equals $2d_n$ and represents the distance between dipole pairs and $\lambda$ is the wavelength of the associated acoustic frequency;

selecting a $(d/\lambda)_{min}$ from said graph for said minimum null depth;

solving the following relationship for $\tau$ $$\log\left(\frac{d}{\lambda}\right)_{max} = \log\left(\frac{d}{\lambda}\right)_{min} - \log \tau \quad (B)$$

wherein $\tau$ is an arbitrary constant associated with the log-period;

solving the following relationship for $d_{n-1}$ $$d_{n-1} = \frac{d_n}{\tau} \quad (C)$$

using $\tau$ from (B) supra;

repeating (C) supra iteratively substituting the previous $d_{n-1}$ result for $d_n$ in (C) and solving for new $d_{n-1}$'s until $2d_n$, $2d_{n-1}$, etc. spacing for a frequency decade has been described; and arranging said hydrophones in accordance with said $2d_n$, $2d_{n-1}$, etc. spacing.

* * * * *